Sept. 15, 1942.   C. A. TOCE ET AL   2,295,978
TWO-CYCLE ENGINE
Original Filed Aug. 23, 1941   3 Sheets-Sheet 1

CHARLES A TOCE
VICTOR J. TOCE
INVENTORS

BY   Lester B. Clarke

ATTORNEY.

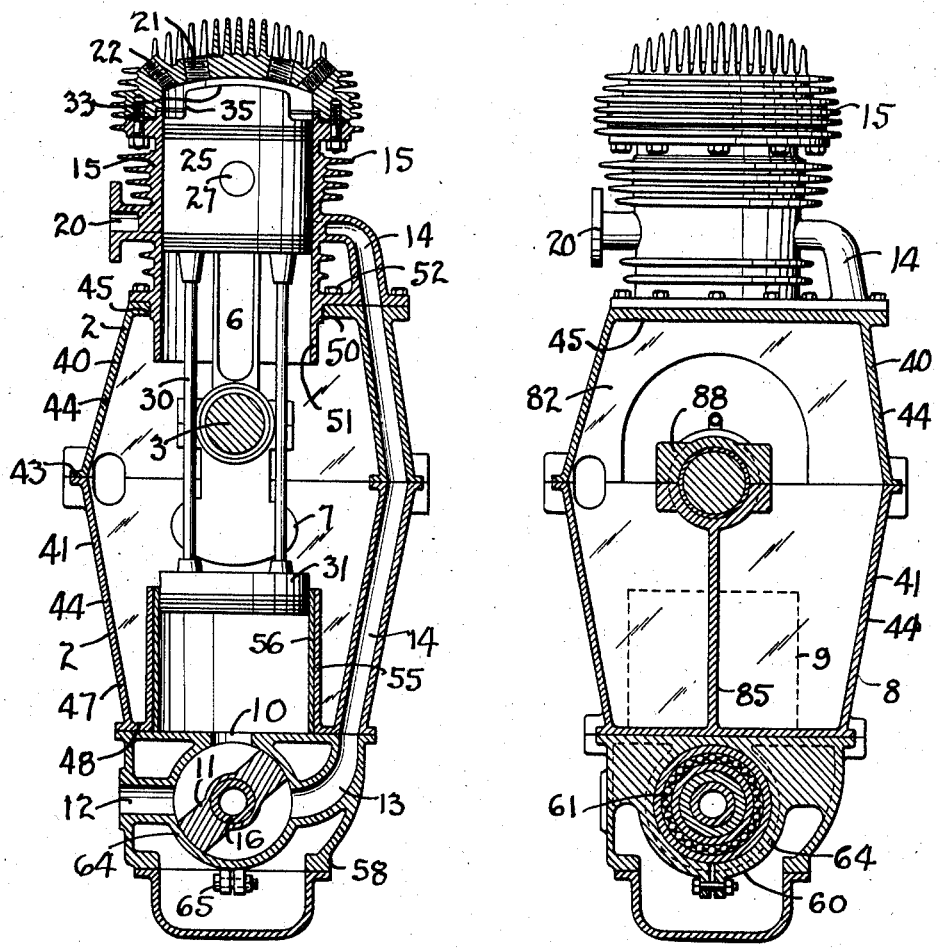

Sept. 15, 1942.   C. A. TOCE ET AL   2,295,978
TWO-CYCLE ENGINE
Original Filed Aug. 23, 1941   3 Sheets-Sheet 3

CHARLES A TOCE
VICTOR J. TOCE
INVENTORS

BY  *Lester B. Clark.*

ATTORNEY.

Patented Sept. 15, 1942

2,295,978

UNITED STATES PATENT OFFICE 2,295,978

TWO-CYCLE ENGINE

Charles A. Toce and Victor J. Toce, Houston, Tex., assignors to Federal Aircraft Engine Corporation, Houston, Tex.

Original application August 23, 1941, Serial No. 408,030, now Patent No. 2,278,038, dated March 31, 1942. Divided and this application March 28, 1942, Serial No. 436,682

4 Claims. (Cl. 123—71)

The invention relates to a two-cycle internal combustion engine of the pre-compression type and specifically includes an arrangement whereby compressed air is fed into the cylinder to scavenge the cylinder and the fuel thereafter injected into the combustion chamber.

This application is a division of our prior copending application, Serial 408,030, filed August 23, 1941, for a two cycle engine which has matured into Patent 2,278,038, dated March 31, 1942, wherein the piston and compression head assembly, and the air compression and fuel injection arrangements are claimed; whereas, in this application the body parts and driving gearing are being claimed.

With two-cycle internal combustion engines various arrangements have been provided heretofore for pre-compressing the explosive mixture and for scavenging the cylinders. Considerable difficulty has been encountered in these prior devices, however, because if the gaseous mixture forced into the combustion cylinder under pressure is to effect a complete scavenging of the combustion gases, it seems obvious that a percentage of the incoming explosive mixture will pass on through the exhaust opening with the combustion gases, so that there has been difficulty in designing an engine whereby satisfactory scavenging could be obtained on the one hand and the economical use of fuel on the other hand.

The present invention contemplates a solution of this problem by pre-compressing air from the atmosphere and using this air as a scavenging medium and after this scavenging operation has been completed and a body of this compressed air trapped in the combustion chamber, then the fuel is injected and the explosion promoted. In this manner it is not imperative that the arrangement of the engine be such that there be no escape of the incoming compressed air through the exhaust port; but, as a matter of fact, some of the incoming air may pass out the exhaust port in order to obtain a satisfactory scavenging of the cylinder.

It is, therefore, one of the objects of the invention to pre-compress air and use it in scavenging a two-cycle internal combustion engine and then inject fuel into the trapped compressed air to obtain an explosive mixture in the combustion chamber.

Another object of the invention is to provide an assembly of parts making up the engine body so that the combustion and compression chambers will be in proper alignment.

Still another object of the invention is to provide particularly shaped parts for the engine body so that they will support the combustion cylinder and a rotary valve block or housing.

It is also an object of the invention to provide a cross bracing within the body so as to provide a bearing for the crank shaft to reinforce the side and base portions of the body.

Still another object of the invention is to provide an engine having a rotary precompression valve which is disposed for rotation below the crank shaft.

Other and further objects of the invention will be readily apparent when the following description is considered in connection with the accompanying drawings, wherein:

Fig. 1 is a longitudinal vertical section thru an engine constructed in accordance with the invention.

Figs. 2, 3, and 4 are transverse sections taken on the lines 2—2, 3—3 and 4—4 respectively of Fig. 1.

Figure 1:
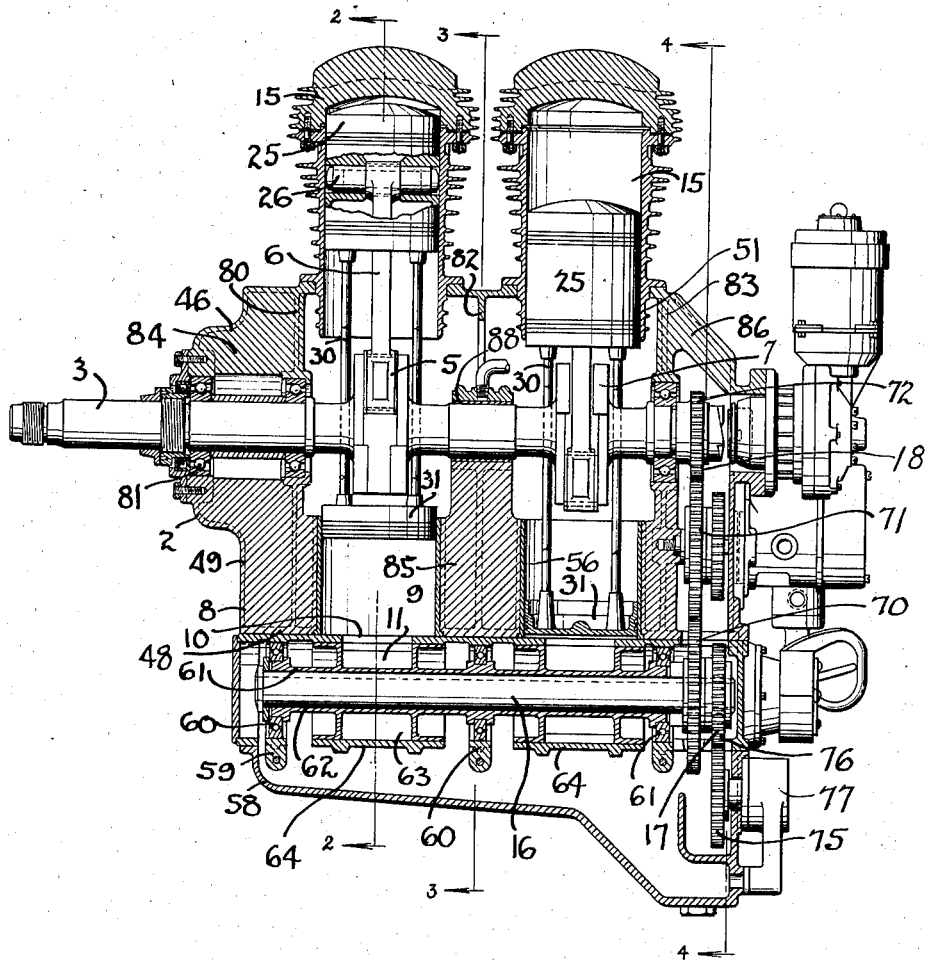
Figure 4:
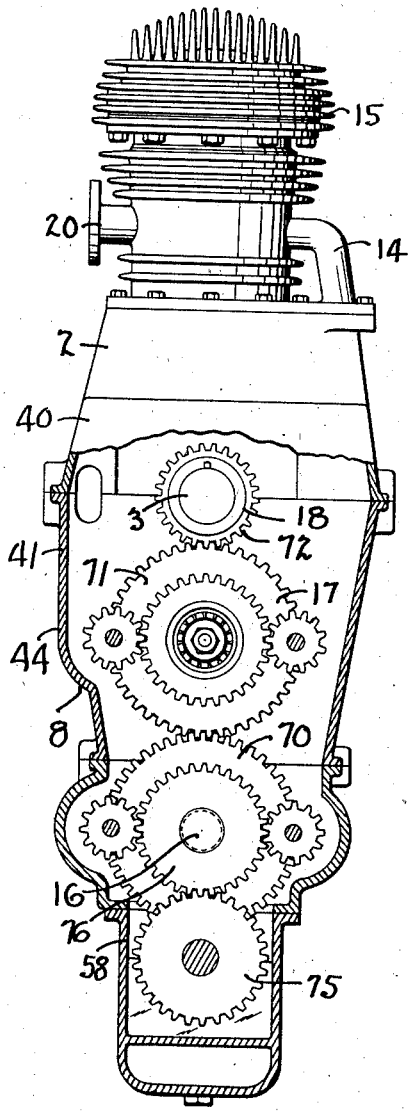

In Fig. 1 the body of the engine is illustrated at 2 and may be of any desired type of construction which is arranged to support a crankshaft 3 by means of the plurality of sets of bearings such as 4. The present form shows a two-cylinder engine wherein the crankshaft has the throw portions 5 arranged to receive the connecting rod 6 of each cylinder. The base portion 8 of the body is arranged with a compression cylinder 9, which is best seen in Fig. 2, as having a port 10 controlled by the rotary valve 11. An inlet 12 into the valve is shown as being opened while the head moves up to permit the inlet of air to the chamber 9. The outlet 13 from the compression chamber is connected to the conduit 14 which is, in turn, connected into the combustion cylinder 15.

The valve 11 may be driven by the valve shaft 16 from the gear train 17 which is, in turn, driven by the gear 18 on the crankshaft 3. Suitable anti-friction bearings and the usual connections for such gearing have been provided.

The combustion cylinder 15, as seen in Fig. 2, has the bypass 14 arranged part way along the cylinder so as to provide for the inlet of compressed air. The exhaust or outlet 20 is shown as being on the opposite side from the inlet but it may be arranged otherwise if desired. The head of this cylinder contains openings 21 which may receive spark or ignition plugs, and the openings 22 may contain suitable injectors for feul.

Figure 5:
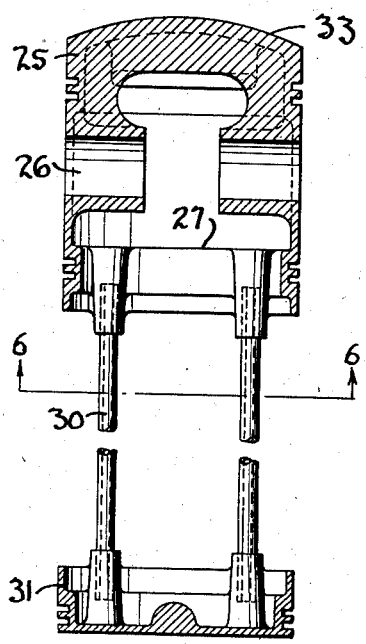
Fig. 5 is a vertical sectional view of the piston and compression unit.

The piston and compression unit is seen in side elevation in Fig. 2 and in section in Fig. 5 wherein the piston 25 has the wrist pin openings 26 to receive the wrist pin 27 carried by the connecting rod 6.

Figure 6:
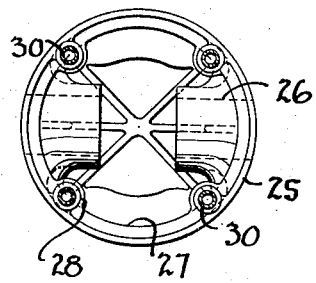
Fig. 6 is a section taken on the line 6—6 of Fig. 5.

The piston 25 is of the barrel type and has a particular construction in the form of a supporting rib 27' adjacent the lower end of the piston. This rib has the bosses 28 thereon, which are seen in Fig. 6 as being four in number. These bosses each receives a rod 30 which may be rigidly connected in the boss in any desired manner. These rods are spaced circumferentially around the piston on quarter-points, as seen in Fig. 6, with a view of straddling the crankshaft 3 in one direction and allowing the operation of the throw 5 of the crank and its counterweight 7 in a transverse direction. In other words, these rods straddle the crankshaft and support the compression head 31 on their lower ends.

The compression head 31 is in the form of a short piston which is arranged to reciprocate in the compression cylinder 9. In this manner the combustion cylinder and the compression cylinder are diametrical with regard to the crankshaft, as is readily apparent from Fig. 2. This piston and compression unit is a rigid assembly so that the compression and combustion cylinders are in direct alignment.

The head of the piston 25 has the baffle portion 33 thereon, as seen in Fig. 2, so that the face tends to deflect the incoming compressed air and cause it to circulate in the combustion chamber, while the opposite face 35 allows the opening of the exhaust port 20 as the piston moves down. In this manner complete scavenging of the combustion cylinder is obtained because the ports and the piston can be so constructed and arranged that the amount of compressed air to be fed into the cylinder will be sufficient to obtain complete scavenging of the combustion gases.

This is true because the exhausting of some of the compressed air along with the combustion gases will not affect the economy of the engine as regards fuel.

The righthand side of Fig. 1 shows the usual mechanism for injection of the fuel and operation of the electric systems which are well known with internal combustion engines and need not be here described in detail.

In operation, as the piston moves down to uncover the inlet connection 14, there will be an inflow of compressed air from the compression cylinder 9. The valve 11 will be so timed as to open on the downstroke of the compression head at such time as to allow the compressed air to feed through the bypass 14 and enter the combustion cylinder 15.

The inlet of the compressed air into the combustion cylinder scavenges the combustion gases therefrom, driving them out the exhaust port 20. As the piston reverses its stroke and closes the inlet and outlet valves, there will be a body of compressed air trapped in the combustion cylinder. The piston moves up to effect further compression of this air. At a suitable period in this operation the desired amount of fuel will be injected into the compressed air so as to obtain an explosive mixture. The ignition of this mixture will occur at the proper time to effect the explosion and power stroke of the engine.

During this upstroke operation the valve 11 will open, as seen in Fig. 2, to permit the inlet of air to the compression chamber, and this valve will close on the downstroke so that the air in the chamber 9 and the by-pass 14 will be compressed. The valve 11 is of such width that the inlet 12 and outlet 13 will never be interconnected.

The construction of the body is such that it is made up of two complementary halves, the upper half 40 and the lower half 41 are connected by the flanges 43 in any suitable manner. These two halves form a box like structure, the upper half 40 having inclined side walls 44 and a flat wall area 45 closing what is shown as the top part in Fig. 2. In Fig. 1 the ends of each half are closed by the end structure 46 while, on the other hand, the lower half 44 has the side walls 47 and the flat wall area 48 with the end structure at 49 as seen in Fig. 1.

The upper half has an opening 50 therein which is arranged to receive the skirt portion 51 of the combustion cylinder 15 which projects into the opening and is held in place by the bolts 52 which affixes the combustion cylinder to the wall area 45.

Extending along one of the walls 44 is the by-pass conduit 14 by which the compressed air moves into the combustion cylinder.

The lower half 44 has a compression cylinder sleeve 55 extending inwardly from the wall area 48 and is arranged to carry the liner 56 in which the compression head 31 is arranged to reciprocate.

Connected to the lower wall area 43 is the crank case 58 which is seen in longitudinal section in Fig. 1. This crank case has the end brackets 59 therein which carry the bearings 60 to support the rotary valve sleeve 61. This sleeve carries the rotor shaft 16 as seen in Fig. 2, so that the shaft and the sleeve rotate as a unit.

This sleeve 61 has the outwardly extending flanges 62 thereon which are spaced apart by the wings 63 of the valve 11. These flanges 62 and the valve 11 rotate inside of a cylindrical liner 64 depending from the top area of the crank case 58. The flanges 62 serve to form a seal at either end of the wing 63 so as to cause the inlet and outlet of air as the valve 11 rotates. A clamp 65 can be used to maintain a tight fit of the sleeve 64 about the rotor.

A central bearing and a front bearing are also carried by the crank case as is the other sleeve 64 for the next adjacent piston assembly. This rotor valve shaft is driven by the gear 70 which meshes with a driven gear 71 which is, in turn, connected to the drive gear 72 on the crank shaft 3. An oil pump gear 75 meshes with the reduction gear 76 so that the speed of the oil pump 77 will effect the desired circulation of oil.

Fig. 3 shows the contour of the crank case 58 at the forward end so as to accommodate the various gears.

Particular attention is directed to the internal construction of the halves 40 and 41 as seen in Figs. 1, 2 and 3. Fig. 3 shows the transverse partition 82 which tend to support the crank bearings 81 so as to prevent vibration. There is a similar rear end partition at 82 and an opposite end partition 83 at the other front end.

These baffles in turn are joined by longitudinal partitions 84, 85 and 86 respectively. These longitudinal baffles serve to brace the bearings and the compression sleeve 55 so that there will be little or no vibration of the bearings and the shaft and the pistons as well as the compression heads will be kept in perfect alignment during operation of the engine.

Broadly the invention contemplates a particular construction of an engine body which can be readily manufactured and the parts quickly assembled.

What is claimed is:

1. A two cycle internal combustion engine including a body composed of upper and lower complementary halves, each half having tapered side walls joined by a flat wall area, ends for each body half, each end having a crankshaft bearing receiving portion, the flat wall area having an opening therein, and a combustion cylinder body projecting thru said opening, an opening in the flat wall area of the other body half, an inwardly projecting sleeve defining said opening, a valve block over said opening and forming a compression chamber, a conduit from the compression chamber thru the block, along a side wall of the body halves, and into said combustion cylinder body, and means to connect said halves cylinder and block together as a unit.

2. In an internal combustion engine assembly having combustion and compression chambers, an engine body including a lower half, said half having inclined side walls spaced apart, a flat base portion connecting said walls, a compression chamber sleeve in said base, and a transverse baffle connecting the side walls on opposite sides of said compression chamber.

3. In an internal combustion engine assembly having combustion and compression chambers, an engine body including a lower half, said half having inclined side walls spaced apart, a flat base portion connecting said walls, a compression chamber sleeve in said base, a transverse baffle connecting the side walls on opposite sides of said compression chamber, and a longitudinal flange extending from said baffle at the center to support said sleeve.

4. In a two cycle internal combustion engine a body, a crank shaft therein, combustion and compression chambers carried by the body and disposed on opposite sides of said shaft, a gear train driven by said shaft, including a drive gear on the shaft, a driven gear therebelow, a rotary valve gear which is in turn driven by said driven gear, and an oil pump gear driven by said valve gear whereby the rotary valve is disposed below the crankshaft.

CHARLES A. TOCE.
VICTOR J. TOCE.